(12) United States Patent
Park et al.

(10) Patent No.: US 9,092,081 B2
(45) Date of Patent: Jul. 28, 2015

(54) REMOTE TOUCH PANEL USING LIGHT SENSOR AND REMOTE TOUCH SCREEN APPARATUS HAVING THE SAME

(75) Inventors: Sung-ho Park, Yongin-si (KR); Sang-hun Jeon, Yongin-si (KR); I-hun Song, Seongnam-si (KR); Chang-jung Kim, Yongin-si (KR); Seung-eon Ahn, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 511 days.

(21) Appl. No.: 12/923,243

(22) Filed: Sep. 10, 2010

(65) Prior Publication Data

US 2011/0241989 A1 Oct. 6, 2011

(30) Foreign Application Priority Data

Apr. 2, 2010 (KR) ........................ 10-2010-0030509

(51) Int. Cl.
*G06F 3/042* (2006.01)
*G06F 3/038* (2013.01)
*G06F 3/041* (2006.01)

(52) U.S. Cl.
CPC ............ *G06F 3/0386* (2013.01); *G06F 3/0412* (2013.01)

(58) Field of Classification Search
CPC .............. H01L 29/7869; H01L 27/124; H01L 21/02565; H01L 21/02554; H01L 27/3262; H01L 29/78696; H01L 27/3244; H01L 29/4908; H01L 33/42; H01L 21/02472; H01L 21/02483; G02F 1/136227; G02F 1/13338; G06F 3/041; G06F 2203/04103; G06F 3/042; G06F 1/3218

USPC .......... 345/694, 695, 698, 156–184; 348/257, 348/294, 308

See application file for complete search history.

(56) References Cited

U.S. PATENT DOCUMENTS

| 5,926,168 | A * | 7/1999 | Fan ............................... 345/158 |
| 6,906,793 | B2 * | 6/2005 | Bamji et al. ................ 356/141.1 |
| 2001/0030324 | A1 * | 10/2001 | Morikawa et al. .............. 257/59 |
| 2005/0206626 | A1 * | 9/2005 | Mattice et al. ................. 345/173 |
| 2007/0257256 | A1 * | 11/2007 | Kugler ............................ 257/40 |
| 2008/0105870 | A1 * | 5/2008 | Yu et al. .......................... 257/49 |
| 2008/0150848 | A1 * | 6/2008 | Chung et al. .................... 345/82 |
| 2008/0303037 | A1 * | 12/2008 | Irving et al. .................... 257/88 |

(Continued)

FOREIGN PATENT DOCUMENTS

| IL | WO 02/49367 | * | 6/2002 | ............... H04N 9/04 |
| IL | WO 02/49367 A2 | * | 6/2002 | ............... H04N 9/04 |

(Continued)

OTHER PUBLICATIONS

Vinay Gupta and A. Mansingh, Breakdown Mechanism in Insulating Zinc Oxide Film, 1998, IEEE.*

*Primary Examiner* — Amare Mengistu
*Assistant Examiner* — Gloryvid Figueroa-Gibson
(74) *Attorney, Agent, or Firm* — Harness, Dickey & Pierce, P.L.C.

(57) ABSTRACT

A remote touch panel includes a plurality of light sensor cells arranged in two dimensions. Each light sensor cell may include a light-sensitive semiconductor layer and first and second electrodes electrically connected to the light-sensitive semiconductor layer. The remote touch panel may be controlled at a remote distance. For example, a large display apparatus can be easily controlled by using a simple light source device, for example, a laser pointer.

26 Claims, 14 Drawing Sheets

(56) References Cited

U.S. PATENT DOCUMENTS

2009/0101900 A1* 4/2009 Chuang et al. .................. 257/59
2010/0085326 A1* 4/2010 Anno ............................. 345/174
2010/0245370 A1* 9/2010 Narayanan et al. ........... 345/522
2011/0037729 A1* 2/2011 Cho et al. ....................... 345/175

FOREIGN PATENT DOCUMENTS

| JP | 1998289053 A | 4/2000 |
| JP | 2006011569 A | 1/2006 |
| JP | 2006227907 A | 8/2006 |
| KR | 10-2009-0077350 A | 7/2009 |

* cited by examiner

REMOTE TOUCH PANEL USING LIGHT SENSOR AND REMOTE TOUCH SCREEN APPARATUS HAVING THE SAME

CROSS-REFERENCE TO RELATED APPLICATIONS

This application claims priority under 35 U.S.C. §119 to Korean Patent Application No. 10-2010-0030509, filed on Apr. 2, 2010, in the Korean Intellectual Property Office (KIPO), the entire contents of which are herein incorporated by reference.

BACKGROUND

1. Field

Example embodiments relate to methods and apparatuses for a remote touch panel using a light sensor, and a remote touch screen apparatus having the same, and more particularly, to a remote touch panel using a light-sensitive oxide semiconductor as a light sensor, and a remote touch screen apparatus having the same.

2. Description of the Related Art

Conventional touch panels are screens that directly receive input data by recognizing a position of a human finger or an object contacting a particular position of the screen, without using a keyboard, and performing a predetermined process using software. Conventional touch screens include a touch panel attached to a screen of a general monitor, to perform its function. A touch panel is an input device that may replace a keyboard or mouse. A touch panel is installed on a surface of a display to perform various input operations in a conventional manner. For example, a user may directly press on a particular position while viewing a screen of a display. Because a touch panel does not require a keyboard and because a touch panel may make operations easier, use of a touch panel is becoming more widespread. Accordingly, touch panels are being used as a basic input device for various computer systems.

There are a variety of types of touch panels, for example, a resistive type, a capacitive type, a surface acoustic wave (SAW) type, an ultraviolet sensing type, and a piezoelectric type. Among these types, touch panels of the resistive type are widely employed as touch screens because this type exhibits high light transmissivity, a fast response speed, superior tolerance, and less influence by an operation environment. With the development of technology, touch panels are implemented using a variety of methods. Accordingly, the price of a touch panel is lowered and thus the use thereof becomes popular. Also, multi-touch technology to recognize multiple contact points, and not simply one contact point, has enabled more diverse and natural operations.

However, conventional touch panels require a panel to be directly touched by using a finger or pen. Thus, most widely used resistive touch panels have a problem in that upper/lower conductive layers may be damaged due to an external pressure. Also, although this method may have a superior sensing effect, it is required that a touch panel and a user should be located close to each other. Accordingly, touch panels can be used only for small or mid-sized displays, for example, general desktop computers, laptop computers, or portable devices, e.g., mobile phones or navigations. However, as the size of a display gradually increases, it is difficult to apply touch panel technology when the distance between a touch display and a user increases.

SUMMARY

Provided are methods and apparatuses for a remote touch panel for operating a large display using a light sensor from a remote distance.

Provided are methods and apparatuses for a remote touch screen apparatus having the remote touch panel.

Additional aspects will be set forth in part in the description which follows and, in part, will be apparent from the description, or may be learned by practice of the presented embodiments.

In accordance with example embodiments, a remote touch panel may include a plurality of light sensor cells arranged in two dimensions, wherein each light sensor cell includes a light-sensitive semiconductor layer and first and second electrodes electrically connected to the light-sensitive semiconductor layer.

The light-sensitive semiconductor layer may be formed of a light-sensitive oxide semiconductor material.

The light-sensitive oxide semiconductor material may transmit visible light and absorb light having a wavelength of 400 nm or less to generate electrons and holes.

The light-sensitive oxide semiconductor material may be $ZnO_x$, doped-$ZnO_x$, or InZnO.

The light-sensitive semiconductor layer may be divided into a plurality of light-sensitive semiconductor cells, each of the light-sensitive semiconductor cells being arranged in each light sensor cell, the first electrodes may extend parallel to each other in a first direction over the plurality of light-sensitive semiconductor cells, and the second electrodes may extend parallel to each other in a second direction that is perpendicular to the first direction, over the plurality of light-sensitive semiconductor cells.

The remote touch panel may further include a first contact arranged to electrically connect the first electrodes and the light-sensitive semiconductor layer, and a second contact arranged to electrically connect the second electrodes and the light-sensitive semiconductor layer, wherein the first and second contacts are arranged in each light sensor cell.

Part of the first contact and part of the second contact may respectively protrude in directions perpendicular to the first and second electrodes by extending from the first and second electrodes.

The plurality of light sensor cells may share the light-sensitive semiconductor layer, the first electrodes may extend parallel to each other in a first direction over the light-sensitive semiconductor layer, and the second electrodes may extend parallel to each other in a second direction that is perpendicular to the first direction, over the light-sensitive semiconductor layer.

The remote touch panel may further include a transparent insulation layer formed over a surface of the light-sensitive semiconductor layer and the first and second electrodes, wherein the first and second electrodes cross each other, without contacting each other, over the same surface of the light-sensitive semiconductor layer.

The remote touch panel may further include a first contact arranged to electrically connect the first electrodes and the light-sensitive semiconductor layer, and a transparent insulation layer formed over a surface of the light-sensitive semiconductor layer and the first and second electrodes, wherein the first and second electrodes cross each other, without contacting each other, over the same surface of the light-sensitive semiconductor layer.

The remote touch panel may further include a first contact arranged to electrically connect the first electrodes and the light-sensitive semiconductor layer, and a transparent insulation layer formed over a surface of the light-sensitive semiconductor layer and the first electrodes and the first contact, wherein the second electrodes are arranged to directly contact a surface of the light-sensitive semiconductor layer opposite to the surface that is coated.

The first electrodes may be arranged to directly contact a surface of the light-sensitive semiconductor layer, and the second electrode may be arranged to directly contact a surface of the light-sensitive semiconductor layer opposite to the surface contacting the first electrodes.

At least one of the first and second electrodes may have a pattern of at least one of circular, oval, or polygonal shape for each light sensor cell area.

The plurality of light sensor cells may share the light-sensitive semiconductor layer, the first electrode may be arranged on a surface of the light-sensitive semiconductor layer and having a pattern of at least one circular, oval, or polygonal shape for each light sensor cell area, and the second electrode may be arranged in one layer without a pattern over an entire area of a surface of the light-sensitive semiconductor layer opposite to the surface on which the first electrodes are arranged.

The remote touch panel may further include a plurality of current sensing sensors that are respectively arranged at a plurality of points whose positions on the light-sensitive semiconductor layer are accurately known.

The first and second electrodes may be transparent electrodes.

The transparent electrode may be formed of ITO or IZO.

Of the first and second electrodes, a positive electrode to which a positive voltage is applied may be processed to have a relatively high work function and a negative electrode to which a negative voltage is applied may be processed to have a relatively low work function.

A positive electrode having a relatively high work function may have a work function within about 4.8-5.2 eV, and a negative electrode having a relatively low work function may have a work function within about 4.1-4.5 eV.

According to example embodiments, a remote touch screen apparatus includes the above remote touch panel, a display apparatus for displaying an image, and a light source apparatus for emitting a light signal to the remote touch panel.

A pixel in the display apparatus may be divided into four areas, three of the four areas may be assigned to RGB sub-pixels for red, green, and blue colors, and a light sensor cell of the remote touch panel may be arranged in the remaining area.

A moving, increasing, decreasing, hiding, or rotating operation may be performed on a part or all of an image that is displayed on the display apparatus, or a selection, execution, or cancel operation of a menu is performed, according to a change in a light signal emitted to the remote touch panel.

The change in a light signal may include any one or a combination of proportional increase or decrease in the size of the light signal, movement of the light signal, extension of the light signal in one direction only, a change in the shape of the light signal, a change in an amount of time the light signal is incident, a change in the intensity of the light signal, a change in the wavelength of the light signal, and a change in the frequency of the light signal that is continuously incident within a predetermined time period.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
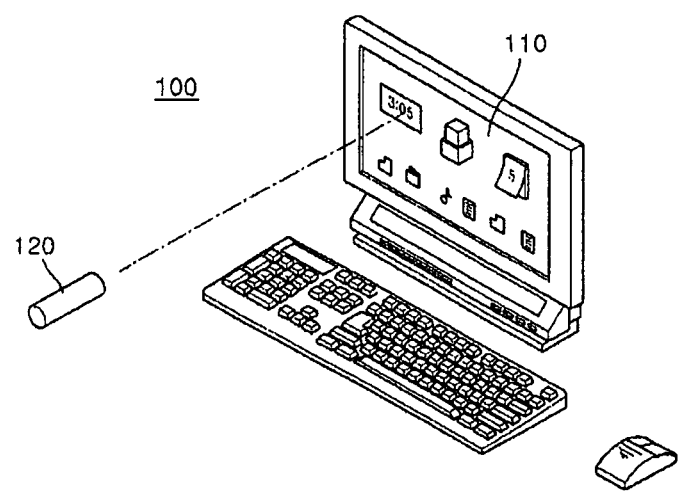
FIG. 1 is a conceptual diagram schematically illustrating an example of remote controlling of a display apparatus with a light source apparatus by using a remote touch panel using a light sensor.

Example embodiments will now be described more fully with reference to the accompanying drawings. Embodiments, however, may be embodied in many different forms and should not be construed as being limited to the embodiments set forth herein. Rather, example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components that may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made in detail to example embodiments, examples of which are illustrated in the accompanying drawings, wherein like reference numerals refer to the like elements throughout. In this regard, example embodiments may have different forms and should not be construed as being limited to the descriptions set forth herein. Accordingly, the example embodiments are merely described below, by referring to the figures, to explain aspects of the present description.

FIG. 1 illustrates an example of a remote touch screen apparatus 100 that includes a display apparatus 110. FIG. 1 is also a conceptual diagram schematically illustrating an example of remotely controlling a display apparatus 110 using a light apparatus 120. In example embodiments, the display apparatus 110 includes a remote touch panel with a plurality of light sensors. In example embodiments, the light sensors of the display apparatus 110 may be arranged in two dimensions. Accordingly, when a light source apparatus 120, for example, a laser pointer, emits light to the display apparatus 110, a light sensor arranged in the remote touch panel senses the light. Because the plurality of light sensor cells may be arranged in two dimensions in the remote touch panel, a coordinate of a position of the incident light may be specified. Thus, the same effect of touching a touch screen with a finger or pen may be obtained.

In example embodiments, the plurality of light sensor cells may include light-sensitive semiconductors. A photocurrent may be generated in the light-sensitive semiconductors by applying an electric field and light energy thereto to generate electrons and holes in the light-sensitive semiconductors. In example embodiments, the amount of light energy applied to the semiconductor may or may not be predetermined. In example embodiments, a position of a light incident on a remote touch panel may be found by using the generated photocurrent. That is, the position of the incident light may be specified by sensing at which of a plurality of light sensor cells the photocurrent is generated.

Figure 2:
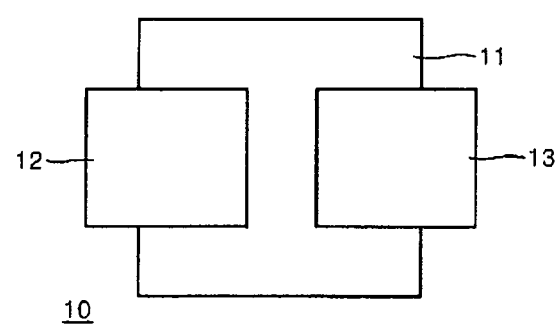
FIG. 2 is a plan view schematically illustrating a structure of a light sensor for explaining a principle of example embodiments.
Figure 3:
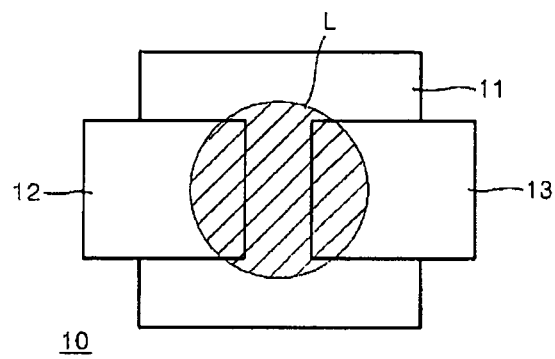
FIG. 3 is a plan view schematically illustrating a state in which light is radiated onto the light sensor of FIG. 2.
Figure 4:
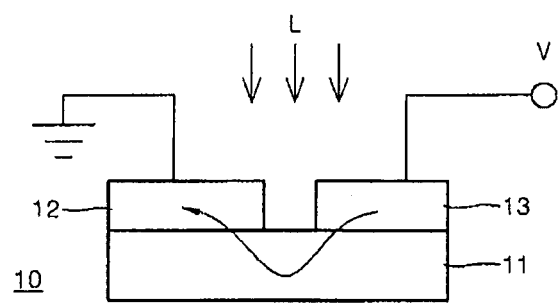
FIG. 4 is a cross-sectional view schematically illustrating a structure of a light sensor according to example embodiments.

FIG. 2 is a plan view schematically illustrating a structure of an example light sensor 10. Referring to FIG. 2, the light sensor 10 may include two electrodes 12 and 13 arranged on a light-sensitive semiconductor 11. In this structure, for example, the first electrode 12 may be grounded and a voltage may be applied to the second electrode 13. In example embodiments, the voltage may or may not be predetermined. An electric field may be applied to the light-sensitive semiconductor 11. As shown in FIG. 3, light L may be emitted to the light-sensitive semiconductor 11 over an area between and on the first and second electrodes 12 and 13. Thus, a photocurrent may be generated in the light-sensitive semiconductor 11. Accordingly, as indicated by the curved arrow of FIG. 4, a current may flow from the second electrode 13 to the first electrode 12 via the light-sensitive semiconductor 11.

Figure 6:
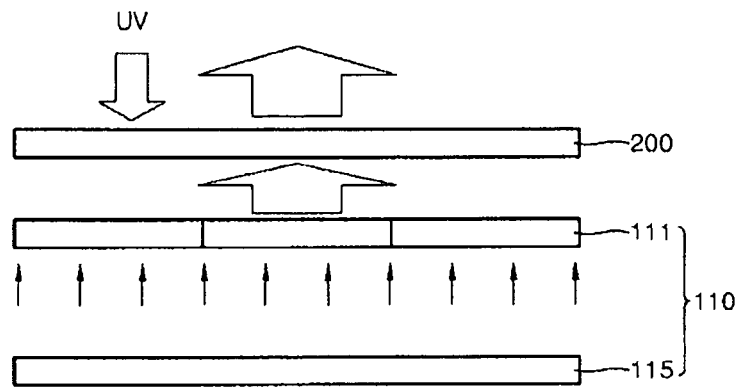
FIG. 6 is a conceptual diagram schematically illustrating a remote touch panel using a light sensor having a light-sensitive oxide semiconductor.

When a remote touch panel using the light sensor 10 is used with the display apparatus 110, the sensitivity of the light sensor 10 may be degraded due to visible light generated from the display apparatus 110 or from a backlight unit 115 (refer to FIG. 6). Also, the brightness of the display apparatus 110 may be reduced due to the light sensor 10. Thus, considering the above points, a material having relatively low sensitivity to visible light and a relatively high transmissivity with respect to visible light may be used as the light-sensitive semiconductor 11. For example, an oxide semiconductor having a wide bandgap may transmit visible light and generate electrons and holes when UV light or near blue light is emitted thereon.

Figure 5:
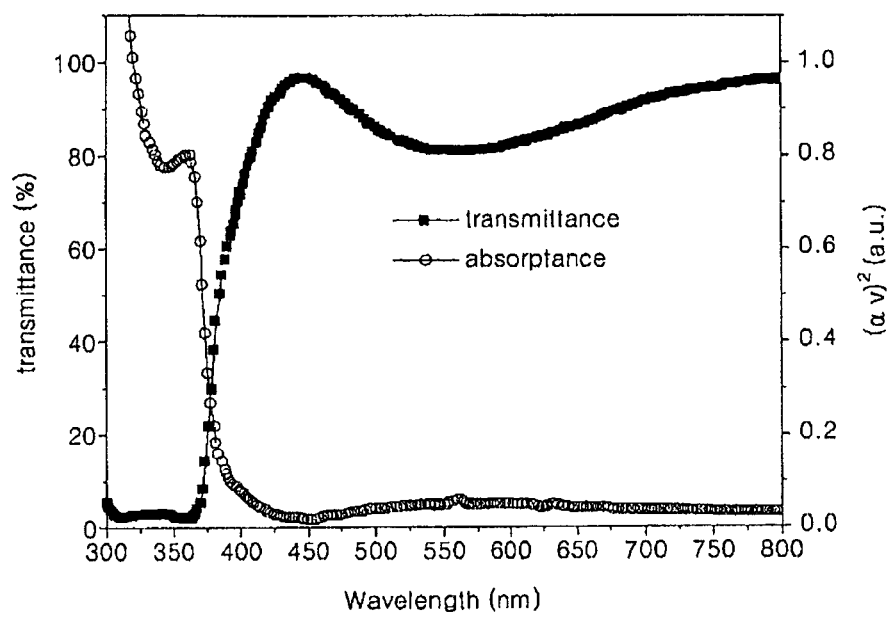
FIG. 5 is a graph showing an absorptance/transmittance curve according to the wavelength of light emitted on a light-sensitive oxide semiconductor.

A non-limiting list of light-sensitive oxide semiconductors satisfying the above conditions includes, for example, $ZnO_x$, doped-$ZnO_x$, and InZnO. When near blue light or UV light having a wavelength of about 400 nm or less is emitted on one of the typical light-sensitive oxide semiconductors, these materials may generate electrons and holes that allow a current to flow, but also maintain a high resistance state with respect to visible light. When two aluminium (Al) electrodes, for example, having a size of about 6 mm×6 mm are formed on the surface of ZnO with an interval of about 0.1 mm therebetween, and a voltage of about 3 V is applied to one of the electrodes, a current of about 0.17 mA flows when UV light is emitted thereon. When UV light is not emitted thereon, a resistance value between the electrodes may be about 96 kΩ. Also, as shown in the graph of FIG. 5, ZnO mostly transmits visible light having a wavelength of about 400 nm or more, and mostly absorbs near blue light or UV light having a wavelength of about 400 nm or less. Thus, it can be seen that the oxide semiconductor materials are suitable for the above-described light-sensitive semiconductor 11.

FIG. 6 is a conceptual diagram schematically illustrating an example remote touch panel using a light sensor having a light-sensitive oxide semiconductor with the properties described above. Referring to FIG. 6, the display apparatus 110 may include a display panel 111 having a plurality of pixels and the backlight unit 115 for providing visible light to the display panel 111. A remote touch panel 200 including an oxide semiconductor material may be arranged above the display apparatus 110. As shown in FIG. 6, visible light generated by the backlight unit 115 may pass through the display panel 111 and may form an image. The image, for example, may or may not be predetermined. The visible light may be incident on the remote touch panel 200. In example embodiments, the oxide semiconductor material of the remote touch panel 200 is characteristically not sensitive to visible light and may transmit the visible light. Thus, the visible light may pass through the remote touch panel 200 without affecting operations of the remote touch panel 200.

Near blue light or UV light having a wavelength of about 400 nm or less may be emitted to the remote touch panel 200. The remote touch panel 200 may sense the near blue light or UV light and may function as a touch panel. Furthermore, because the oxide semiconductor material of the remote touch panel 200 characteristically absorbs light having a wavelength of about 400 nm or less, near blue light or UV light emitted to the remote touch panel 200 may not reach the display apparatus 110. When relatively high energy light, for example, UV light, is incident on the display apparatus 110, internal elements, for example, a thin film transistor (TFT), may be damaged or may malfunction. Thus, the remote touch panel 200 may protect the display apparatus 110 from UV light emitted to the remote touch panel 200.

Figure 7:
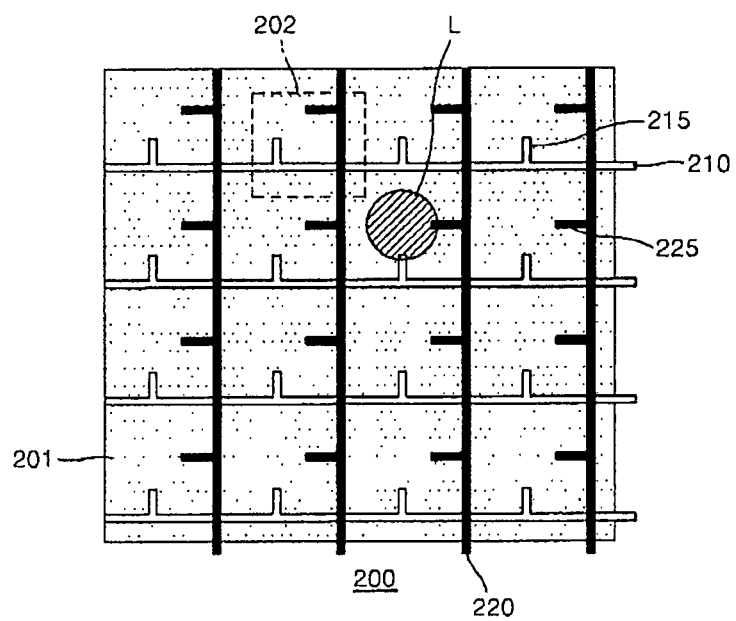
FIG. 7 is a plan view schematically illustrating a structure of the remote touch panel using a light sensor having a light-sensitive oxide semiconductor of FIG. 6.

FIG. 7 is a plan view schematically illustrating a structure of the remote touch panel 200 according to example embodiments. The remote touch panel 200 may include a light-sensitive oxide semiconductor layer 201 as described above. Referring to FIG. 7, a plurality of horizontal and vertical conductive lines 210 and 220 may be arranged respectively in rows and columns above a light-sensitive oxide semiconductor layer 201. For example, the vertical conductive lines 220 may extend above the light-sensitive oxide semiconductor layer 201 in a vertical direction. In example embodiments, the vertical conductive lines 220 may be arranged perpendicularly to the horizontal conductive lines 210 and may also be arranged parallel to each other. Although the horizontal conductive lines 210 and the vertical conductive lines 220 appear to contact and cross each other in the drawing, the horizontal conductive lines 210 and the vertical conductive lines 220 may substantially cross each other without contacting each other, for example, by crossing at different heights. The horizontal conductive lines 210 and the vertical conductive lines 220 may be transparent and may function as electrodes. For example, the horizontal and vertical conductive lines 210 and 220 may be formed of a transparent conductive material such as indium tin oxide (ITO) or indium zinc oxide (IZO).

In example embodiments, the horizontal and vertical conductive lines 210 and 220 may be electrically connected to the light-sensitive oxide semiconductor layer 201 via first and second conductive contacts 215 and 225, without directly contacting the light-sensitive oxide semiconductor layer 201. For example, the first contact 215 may be arranged to electrically connect the horizontal conductive lines 210 to the light-sensitive oxide semiconductor layer 201, whereas the second contact 225 may be arranged to electrically connect the vertical conductive lines 220 to the light-sensitive oxide semiconductor layer 201. In example embodiments, one end of the first contact 215 may contact the light-sensitive oxide semiconductor layer 201 and another end thereof may contact the horizontal conductive lines 210. Also, one end of the second contact 225 may contact the light-sensitive oxide semiconductor layer 201 and another end thereof may contact the vertical conductive lines 220. The first and second contacts 215 and 225 may be arranged for each of light sensor cells 202 for sensing a position of incident light. Also, as shown in FIG. 7, parts of the first and second contacts 215 and 225 may protrude toward the light sensor cells 202 respectively in directions perpendicular to each of the horizontal conductive lines 210 and the vertical conductive lines 220. The first and second contacts 215 and 225 may be formed of a transparent conductive material such as ITO or IZO.

In example embodiments, the light sensor cells 202 may include the horizontal and vertical conductive lines 210 and 220 and the first and second contacts 215 and 225. Each sensor cell may share the light-sensitive oxide semiconductor layer 201. Nevertheless, because a current flows only in an area of the light-sensitive oxide semiconductor layer 201 on which light is incident and because other areas on which light is not incident remains in a high resistance state, a position of incident light on the semiconductor layer 201 may be sensed. For example, referring to FIG. 7, light L may be incident on only one of the light sensor cells 202 and a current flows only between the first and second contacts 215 and 225 that are electrically connected to the light sensor cell 202 on which the light L is incident.

Figure 8:
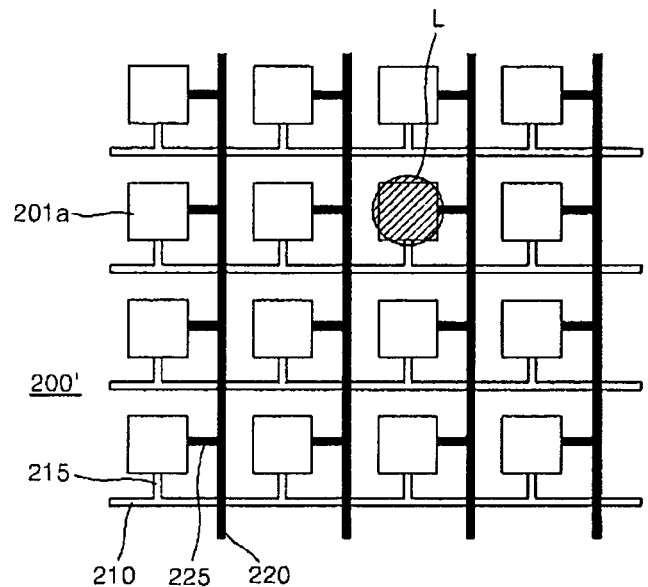
FIG. 8 is a plan view schematically illustrating another structure of the remote touch panel using a light sensor having the light-sensitive oxide semiconductor of FIG. 7.

In example embodiments, to further separate the light sensor cells 202, the light-sensitive oxide semiconductor layer 201 may be patterned into a plurality of cells. FIG. 8 is a plan view schematically illustrating an exemplary structure of a remote touch panel 200' using a light-sensitive oxide semiconductor layer patterned into a plurality of cells. Referring to FIG. 8, the remote touch panel 200' may include a plurality of light-sensitive oxide semiconductor cells 201a that may be separated from each other. The horizontal and vertical conductive lines 210 and 220 may be arranged along the row and column directions, and the first and second contacts 215 and 225 may electrically connect the light-sensitive oxide semiconductor cells 201a to the horizontal and vertical conductive lines 210 and 220. One light-sensitive oxide semiconductor cell 201a may be arranged for each light sensor cell 202. Compared to the remote touch panel 200 of FIG. 7, the remote touch panel 200' of FIG. 8 is different in that one light-sensitive oxide semiconductor layer 201 is divided into the plurality of light-sensitive oxide semiconductor cells 201a. The horizontal and vertical conductive lines 210 and 220 and the first and second contacts 215 and 225 may be the same as those of the embodiment of FIG. 7.

Figure 9:
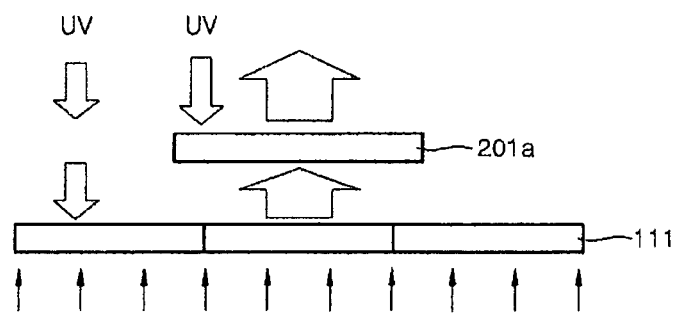
FIG. 9 is a conceptual diagram schematically illustrating an example in which the remote touch panel of FIG. 8 is applied to a display apparatus.

As shown in FIG. 8, a gap may exist between the light-sensitive oxide semiconductor cells 201a. Therefore, as shown in FIG. 9, when applied to the display apparatus 110 of FIG. 6, the gap may allow UV light or near blue light to be incident on the display panel 111 located under or below the light-sensitive oxide semiconductor cells 201a. In example embodiments, light having relatively high energy, for example, UV light or near blue light, may affect operations of the display panel 111. Thus, when the remote touch panel 200' of FIG. 8 is in use, a protection layer, for example, a black matrix or a UV filter, may be arranged on a surface or inside the display panel 111 to protect the display panel 111.

In the above description, the remote touch panel 200 or 200' on the surface of the display apparatus 110 is described. However, as in the example of FIG. 8, when the light-sensitive oxide semiconductor cells 201a are in use, the remote touch panel 200' may be incorporated in the display panel 111 of the display apparatus 110. For example, a pixel of the display panel 111 may be divided into four regions. Three of the four regions may be assigned to RGB sub-pixels for red, green, and blue colors. In example embodiments, the fourth region may include one of the light sensor cells 202 that includes the divided light-sensitive oxide semiconductor cells 201a of the remote touch panel 200'. Accordingly, a remote touch screen in which the display apparatus and the remote touch panel are incorporated in a single substrate may be provided. In example embodiments, a protection layer for protecting the display panel 111 from UV light may be arranged on the surface or in the display panel 111.

Figure 10:
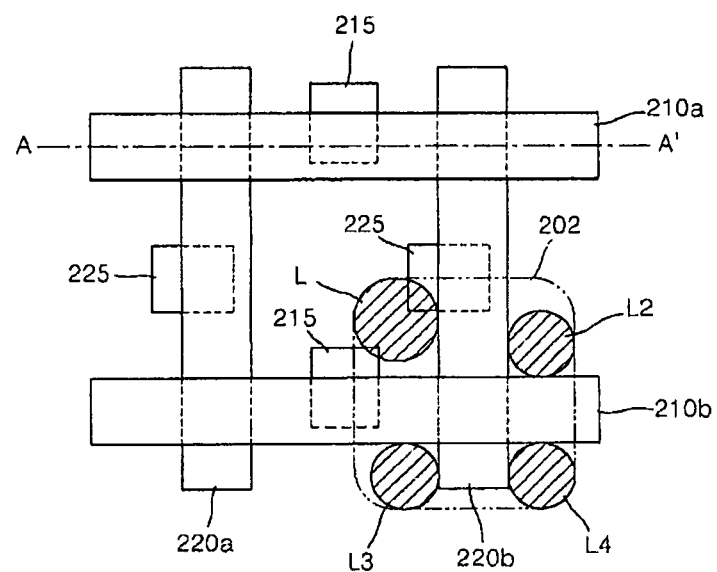
FIG. 10 illustrates an area of a light sensing cell on which light emitted is recognized by a single coordinate, and a structure in which horizontal and vertical conductive lines and first and second contacts are arranged.

FIG. 10 illustrates, in detail, an example of an area of the light sensor cell 202 in which light emitted thereon is recognized by a single coordinate, and a structure in which the above-described horizontal and vertical conductive lines 210 and 220 and the first and second contacts 215 and 225 are arranged. For convenience of explanation, FIG. 10 illustrates only two horizontal conductive lines 210a and 210b and two vertical conductive lines 220a and 220b. Although not shown, it is understood that the light-sensitive oxide semiconductor layer 201 is located under the lines. Referring to FIG. 10, the first and second horizontal conductive lines 210a and 210b may pass over the first and second vertical conductive lines 220a and 220b. The first contact 215, for electrical connection to the light-sensitive oxide semiconductor layer 201, may be arranged under each of the horizontal conductive lines 210a and 210b. The second contact 225, for electrical connection to the light-sensitive oxide semiconductor layer 201, may be arranged under each of the vertical conductive lines 220a and 220b.

In the structure described above, when light is incident on the light-sensitive oxide semiconductor layer 201, a current may flow between at least one of the horizontal conductive lines 210a and 210b and at least one of the vertical conductive lines 220a and 220b. Thus, by sensing in which of the horizontal conductive lines 210a and 210b and in which of the vertical conductive lines 220a and 220b a current may flow, a coordinate of a position of the incident light may be obtained. For example, when first light L1 is incident on the light-sensitive oxide semiconductor layer 201, a current flows between the second horizontal conductive line 210b and the second vertical conductive line 220b. Also, when second light L2 is incident on the light-sensitive oxide semiconductor layer 201, a current may flow between the second horizontal conductive line 210b and the second vertical conductive line 220b. Likewise, a current may flow between the second horizontal conductive line 210b and the second vertical conductive line 220b when third light L3 or fourth light L4 is incident on the light-sensitive oxide semiconductor layer 201. Thus, the coordinates of the first to fourth lights L1-L4 incident on the four different positions in FIG. 10 may be recognized by the same coordinate. As shown in FIG. 10 by a dotted rectangle, an overall area where incident light can be recognized by the same coordinate may be regarded as one light sensor cell 202.

Figure 11:
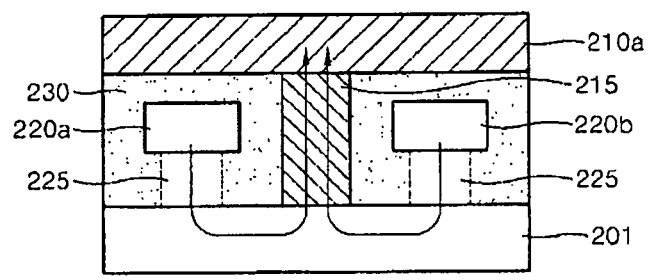
FIG. 11 is a cross-sectional view of the remote touch panel of FIG. 10 taken along a line XI-XI'.

FIG. 11 is a cross-sectional view of the remote touch panel 200 or 200' taken along a line XI-XI' of FIG. 10. Referring to FIG. 11, the first and second vertical conductive lines 220a and 220b and the first horizontal conductive line 210a are arranged above the light-sensitive oxide semiconductor layer 201 and separated from each other. The first contact 215 may be connected between the first horizontal conductive line 210a and the light-sensitive oxide semiconductor layer 201. Also, as indicated by hidden-lines of FIG. 11, the second contact 225 may be connected between the light-sensitive oxide semiconductor layer 201 and the first and second vertical conductive lines 220a and 220b. As shown in FIG. 10, because the second contact 225 may be located between the first and second horizontal conductive lines 210a and 210b, the second contact 225 may not be directly seen in the cross-sectional view of FIG. 11. However, in example embodiments, the second contact 225 may be arranged under all portions the first and second vertical conductive lines 220a and 220b. In this case, the second contact 225 may be seen directly in the cross-sectional view of FIG. 11. A transparent insulation layer 230 may be formed over a surface of the light-sensitive oxide semiconductor layer 201 and the horizontal and vertical conductive lines 210 and 220. The transparent insulation layer 230 may be formed of a material, for example, $SiO_2$. In FIG. 11, arrows indicate a flow of current when light is incident thereon.

Figure 12:
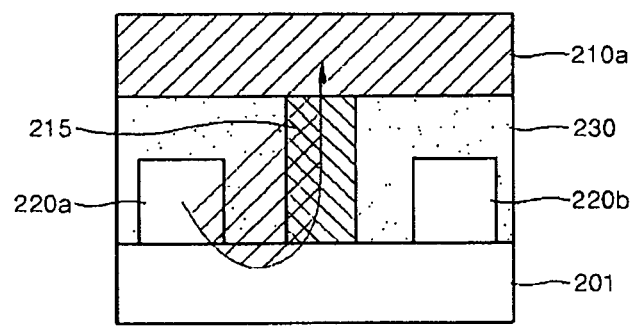
FIGS. 12-14 schematically illustrate various examples of cross-sections of other remote touch panels.
Figure 13:
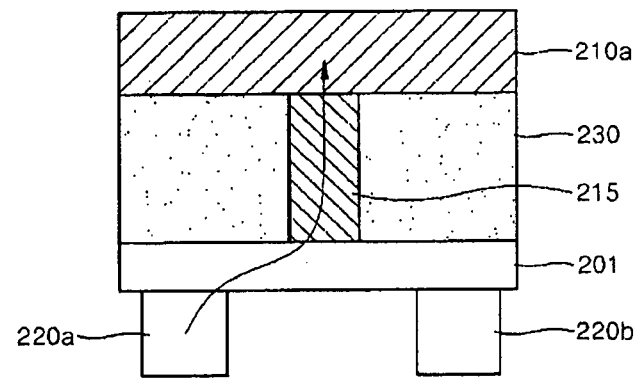
Figure 14:
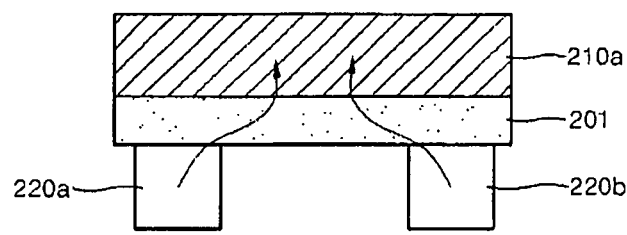

FIGS. 12-14 schematically illustrate various examples of cross-sections of the remote touch panels 200 and 200'. In example embodiments, as shown in FIG. 12, the second contact 225 may be omitted and the first and second vertical conductive lines 220a and 220b may be arranged to directly contact the light-sensitive oxide semiconductor layer 201. Example embodiments, however, are not limited thereto. For example, referring to FIG. 13, the first and second vertical conductive lines 220a and 220b may be directly arranged on a surface of the light-sensitive oxide semiconductor layer 201 that is opposite to a surface on which the first and second horizontal conductive lines 210a and 210b are formed. The transparent insulation layer 230 may be formed over a surface of the light-sensitive oxide semiconductor layer 201 and the horizontal conductive line 210a and the first contact 215. In addition, as shown in FIG. 14, the first contact 215 and the transparent insulation layer 230 may be omitted and the horizontal conductive line 210a may be arranged to directly contact a surface of the light-sensitive oxide semiconductor layer 201. As additionally shown in FIG. 14, the first and second vertical conductive lines 220a and 220b may be arranged to directly contact a surface of the light-sensitive oxide semiconductor layer 201 that is opposite to the surface on which the horizontal conductive line 210a is formed. Arrows in FIGS. 12-14 indicate a flow of current that may be formed when light is incident thereon. It can be seen that flows of current become shorter from FIG. 11 to FIG. 14. Thus, the examples shown in FIGS. 12-14 may be applied when the light-sensitive oxide semiconductor layer 201 maintains a characteristic similar to complete insulation body when UV light or near blue light is not emitted thereon, for example, to prevent or reduce a leakage of current. In example embodiments, the structures of the remote touch panels 200 and 200' may be relatively simple and thus a manufacturing process thereof may likewise be relatively simple and a manufacturing cost thereof may be reduced or minimized.

Figure 15:
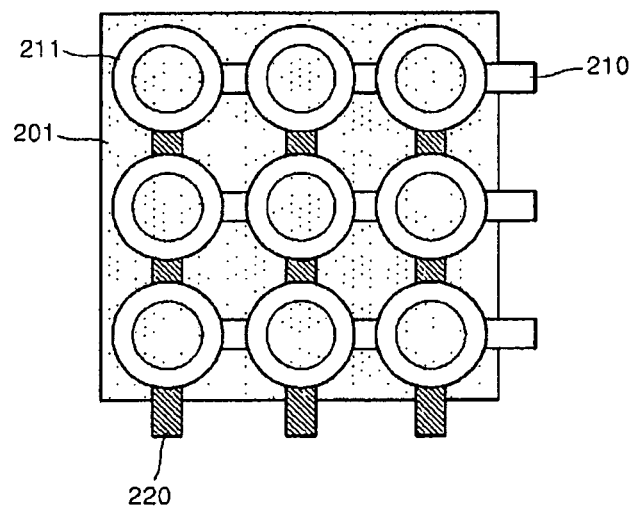
FIG. 15 illustrates a remote touch panel having a horizontal conductive line having a circular pattern.

In example embodiments, the horizontal and vertical conductive lines 210 and 220 may have a pattern having any of a variety of shapes in addition to a simple linear line. FIG. 15, for example, illustrates an example of a remote touch panel in which the horizontal conductive lines 210 are formed to include a circular pattern 211. Referring to FIG. 15, the horizontal conductive lines 210 may have the circular pattern 211 which may or may not be formed at a predetermined interval. For example, the horizontal conductive lines 210 may each have at least one circular pattern 211 for each of light sensor cell areas of the remote touch panel. In example embodiments, when light is incident on the center of the circular pattern 211, current may flow between the horizontal and vertical conductive lines 210 and 220. Thus, determination of a coordinate of a position of incident light may be further precisely specified.

Although FIG. 15 illustrates a circular pattern 211, example embodiments are not limited thereto. For example, the pattern of the horizontal conductive lines 210 may include a pattern having an oval shape or a polygonal shape, e.g., a rectangle, rather than or in addition to a circular shape. In FIG. 15, the vertical conductive lines 220 may have a relatively simple linear shape as described above.

In FIG. 15, the horizontal conductive lines 210 are illustrated as having a pattern with circular shapes. However, example embodiments are not limited thereto. For example, rather than forming the horizontal conductive lines 210 to include the pattern of circular shapes, the pattern may be formed with/by the vertical conductive lines. It should be understood that the pattern formed with the vertical conductive lines may include oval shaped patterns or polygon shaped patterns as discussed previously. In addition, both of the horizontal and vertical conductive lines 210 and 220 may have a pattern. In this case, the pattern of the horizontal conductive lines 210 and the pattern of the vertical conductive lines 220 may be the same or different from each other. When both of the horizontal and vertical conductive lines 210 and 220 have a pattern, the pattern of the horizontal conductive lines 210 and the pattern of the vertical conductive lines 220 may be precisely matched with each other.

Figure 16:
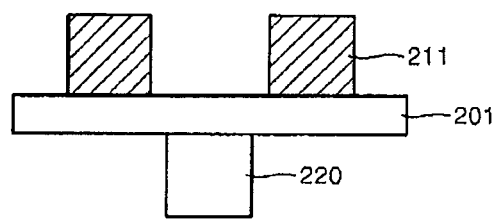
FIG. 16 is a cross-sectional view of a light sensor area of the remote touch panel of FIG. 15.

FIG. 16 is a cross-sectional view of a light sensor area of the remote touch panel of FIG. 15. Referring to FIG. 16, the circular pattern 211 of the horizontal conductive lines 210 may be arranged on an upper surface of the light-sensitive oxide semiconductor layer 201, and the vertical conductive line 220 may be arranged on a lower surface of the light-sensitive oxide semiconductor layer 201. Thus, the example of FIG. 16 employs the cross-sectional structure of FIG. 14. In the cross-sectional structures of FIGS. 12 and 13, the horizontal conductive lines 210 or the vertical conductive lines 220 may have a predetermined pattern.

In the above descriptions, the remote touch panel is described as including the horizontal conductive lines 210 and the vertical conductive lines 220, each of which is formed of a plurality of lines arranged in parallel with each other. However, a different structure of the electrodes may be available.

Figure 17:
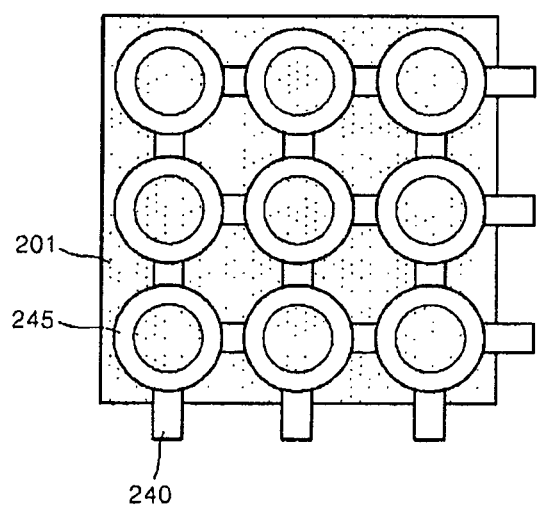
FIG. 17 illustrates a remote touch panel having a single large lower electrode and an upper electrode having a pattern.
Figure 18:
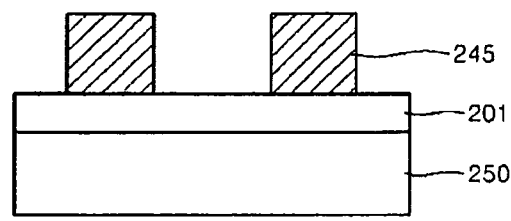
FIG. 18 is a cross-sectional view of one light sensor area of the remote touch panel of FIG. 17.

FIGS. 17 and 18 are respectively a plan view and a cross-sectional view illustrating a remote touch panel including an upper electrode layer 240 having a pattern and a single large lower electrode 250. In example embodiments, the pattern may or may not be predetermined. The cross section of FIG. 18 shows only one of the light sensor areas of the remote touch panel of FIG. 17. Referring to FIGS. 17 and 18, the single large lower electrode 250 is arranged as one layer over the entire lower surface of the light-sensitive oxide semiconductor layer 201. In example embodiments, the single large lower electrode may not have a pattern. Also, the upper electrode layer 240 having at least one circular pattern 245 may be provided on the upper surface of the light-sensitive oxide semiconductor layer 201, for each light sensor area. As described above, the pattern of the upper electrode layer 240 may have an oval, a circular, or a polygonal shape, e.g., a rectangle. As shown in FIG. 18, each pattern 245 may be electrically connected to all other neighboring patterns. Thus, a photocurrent generated from a particular light sensor area may flow through the entire upper electrode 240 along all patterns 245.

Figure 19:
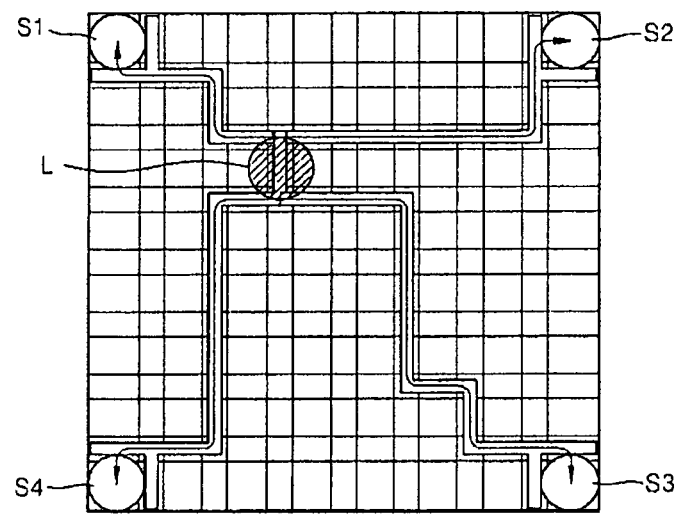
FIG. 19 is a view for explaining a principle of sensing a position where light is incident in the remote touch panel of FIG. 17.

FIG. 19 is a view for explaining a principle of sensing a position of light incident on the remote touch panel of FIGS. 17 and 18. Referring to FIG. 19, when light L is incident on a certain point on a surface of the remote touch panel, a photocurrent is generated from the point and flows over the entire remote touch panel along the upper electrode 240. The photocurrent arrives at a point at a time corresponding to a distance from the incident position of the light L. Thus, by measuring arrival time differences between multiple points whose positions are accurately known, the position of the incident light L may be calculated. For example, as shown in FIG. 19, sensors S1-S4 for sensing current may be arranged at four corners of the remote touch panel. Time differences between moments when the four sensors S1-S4 sense the current may be measured, and thus, the position on which the light L is incident on the remote touch panel may be checked based on the time differences. Although FIG. 19 illustrates that the four current sensors S1-S4 are arranged at the four corners of the light-sensitive oxide semiconductor layer 201, a plurality of current sensors may be located at a plurality of points whose positions are accurately known.

In the above-described remote touch panel according to example embodiments, the work function of an electrode material may be adjusted in order to further reduce a leakage of current when light is not incident and further facilitate a flow of current when light is incident. For example, between the horizontal conductive lines 210 and the vertical conductive lines 220, or between the upper electrode 240 and the lower electrode 250, a positive electrode to which a positive voltage is applied may be processed to have a relatively high work function. For example, the positive electrode may be processed to have a work function within about 4.8-5.2 eV. In example embodiments, the positive electrode may have an electron barrier. Thus, movement of electrons between the light-sensitive oxide semiconductor layer 201 and the positive electrode when light is not incident may be prevented or reduced. Also, between the horizontal conductive lines 210 and the vertical conductive lines 220, or between the upper electrode 240 and the lower electrode 250, a negative electrode to which a negative voltage may be applied or which may be grounded may be processed to have a relatively low work function. For example, the negative electrode may be processed to have a work function within about 4.1-4.5 eV. In example embodiments, the negative electrode may have a hole barrier. Thus, movement of holes between the light-sensitive oxide semiconductor layer 201 and the negative electrode when light is not incident may be prevented or reduced. The work functions of the positive electrode and the negative electrode may be achieved by adjusting a ratio between indium (In) and tin (Sn), or indium (In) and zinc (Zn), when, for example, ITO or IZO is used as a material for the electrode.

In the descriptions above, a variety of structures of a remote touch panel using a light sensor are discussed. In such a remote touch panel, the remote touch panel may perform a variety of functions by variously changing UV light or near blue light incident on the remote touch panel.

Figure 20A:
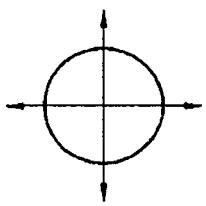
FIGS. 20A-20I illustrate a variety of light signals that may be incident on a remote touch panel.
Figure 20B:
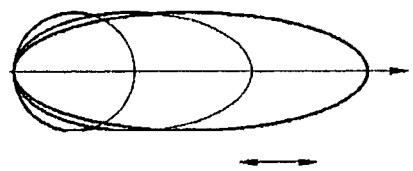
Figure 20C:
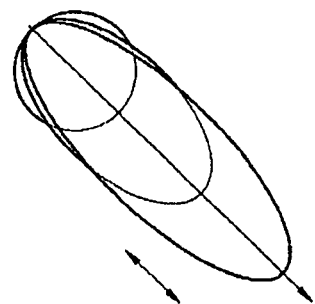
Figure 20D:
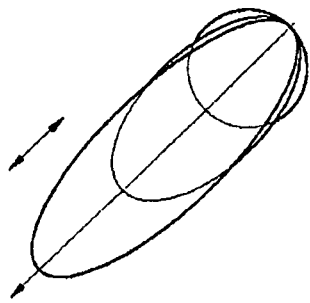
Figure 20E:
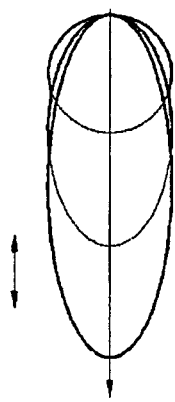
Figure 20F:
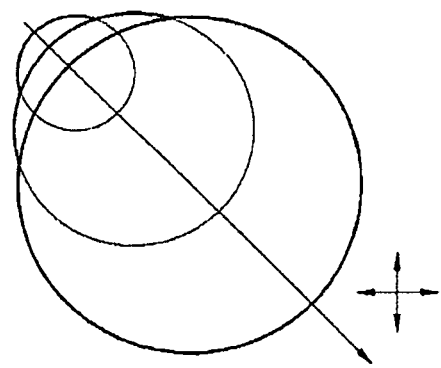
Figure 20G:
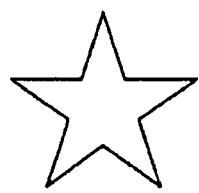
Figure 20H:
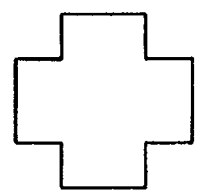
Figure 20I:
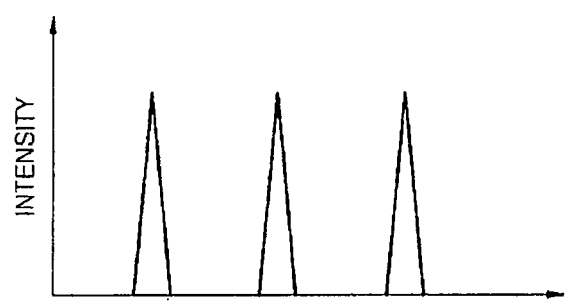

FIGS. 20A-20I illustrate a variety of light signals that may be incident on a remote touch panel. For example, FIG. 20a illustrates an example in which the size of a circular light signal proportionally increases in all directions while maintaining a center thereof. In the following drawings, arrows denote directions in which a light signal extends. Also, FIG. 20B illustrates an example in which a circular light signal extends in a horizontal direction and becomes an oval. FIGS. 20C and 20D illustrate examples in which a circular light signal extends in diagonal directions and become an oval. FIG. 20E illustrates an example in which a circular light signal extends in a vertical direction and becomes an oval. FIG. 20F illustrates an example in which a circular light signal extends with a center thereof moving in a diagonal direction. FIGS. 20G and 20H illustrate examples of light signal having a star shape and a cross shape, and not a circular shape, respectively. FIG. 20I illustrates an example in which a light signal is continuously incident with a time interval, for example, a pulse. In example embodiments, the time interval may or may not be predetermined. The continuous incident frequency of the light signal may be changed within a time period that may or may not be predetermined. Although it is not shown, other changes of a light signal, for example, a change in an amount of time a light signal is incident, a change in an intensity of an incident light signal, or a change in the wavelength of an incident light signal may be used.

According to the above changes in the light signal, for example, an operation such as moving, increasing, decreasing, hiding, or rotating of a part or the whole of an image that is displayed on a display apparatus may be performed. Also, an operation such as selection, execution, or cancellation of a particular menu on a display apparatus, a computer system, or TV may be performed. In particular, when a 3D display apparatus is in use, a depth control command for an image displayed by a 3D display apparatus may be available. For example, as shown in FIG. 20A or 20F, a particular image located in an area where a light signal is incident may appear to be closer, that is, to have a relatively shallow depth, during an extension of a light signal, or a particular image located in the area where a light signal is incident may appear to be farther, that is, to have a relatively deep depth, during a contraction of the light signal. Thus, complicated and diverse operations may be remotely controlled by using a simple light source apparatus, for example, a laser pointer, in the above method.

Figure 21:
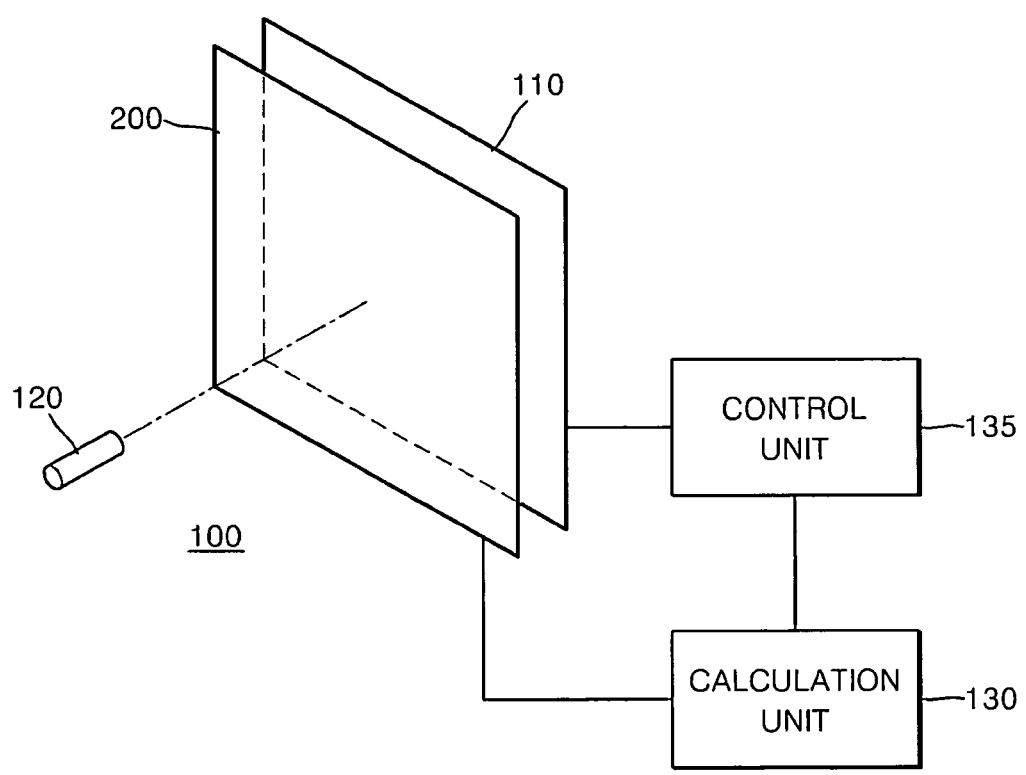
FIG. 21 is a remote touch screen apparatus according to example embodiments.

For example, referring to FIG. 21, the remote touch screen apparatus 100 may comprises a calculation unit 130 and a control unit 135 in order to perform the above operations. The calculation unit 130 calculates the changes in the light signal emitted to the remote touch panel 200 and provide information on the light signal changes to the control unit 135. The control unit 135 receives the information on the light signal changes from the calculation unit 130 and controls the display apparatus 110 to perform a particular operation among the above operations based on the information.

As described above, according to example embodiments, a remote touch panel using a light sensor, and a remote touch screen apparatus having the remote touch panel are described and illustrated. However, It should be understood that example embodiments described therein should be considered in a descriptive sense only and not for purposes of limitation. Descriptions of features or aspects within example embodiments should typically be considered as available for other similar features or aspects in other embodiments.

What is claimed is:

1. A remote touch panel comprising:
a plurality of light sensor cells arranged in two dimensions, wherein each light sensor cell includes a light-sensitive semiconductor layer including a light-sensitive oxide semiconductor material, the light-sensitive oxide semiconductor material generating at least one of electrons and holes in response to light, and first and second electrodes electrically connected to the light-sensitive semiconductor layer.

2. The remote touch panel of claim 1, wherein the light-sensitive oxide semiconductor material transmits visible light and absorbs light having a wavelength of 400 nm or less to generate electrons and holes.

3. The remote touch panel of claim 1, wherein the light-sensitive oxide semiconductor material is one of $ZnO_x$, doped-$ZnO_x$, and InZnO.

4. The remote touch panel of claim 1, wherein the light-sensitive semiconductor layer is divided into a plurality of light-sensitive semiconductor cells, each of the light-sensitive semiconductor cells being arranged in each light sensor cell, the first electrodes extending parallel to each other in a first direction over the plurality of light-sensitive semiconductor cells, and the second electrodes extending parallel to each other in a second direction that is perpendicular to the first direction, over the plurality of light-sensitive semiconductor cells.

5. The remote touch panel of claim 4, further comprising:
first contacts electrically connecting the first electrodes to the light-sensitive semiconductor layer; and
second contacts electrically connecting the second electrodes to the light-sensitive semiconductor layer,
wherein the first and second contacts are arranged in each light sensor cell.

6. The remote touch panel of claim 5, wherein parts of the first contacts and parts of the second contacts protrude in directions perpendicular to the first and second electrodes by extending from the first and second electrodes.

7. The remote touch panel of claim 1, wherein the plurality of light sensor cells share the light-sensitive semiconductor layer, the first electrodes extend parallel to each other in a first direction over the light-sensitive semiconductor layer, and the second electrodes extend parallel to each other in a second direction that is perpendicular to the first direction, over the light-sensitive semiconductor layer.

8. The remote touch panel of claim 7, further comprising:
first contacts electrically connecting the first electrodes to the light-sensitive semiconductor layer; and
second contacts electrically connecting the second electrodes to the light-sensitive semiconductor layer,
wherein the first and second contacts are in each light sensor cell.

9. The remote touch panel of claim 8, wherein parts of the first contacts and parts of the second contacts protrude in directions perpendicular to the first and second electrodes by extending from the first and second electrodes.

10. The remote touch panel of claim 8, further comprising:
a transparent insulation layer on a surface of the light-sensitive semiconductor layer and the first and second electrodes, wherein the first and second electrodes cross each other, without contacting each other, on the surface of the light-sensitive semiconductor layer.

11. The remote touch panel of claim 7, further comprising:
first contacts electrically connecting the first electrodes to the light-sensitive semiconductor layer; and
a transparent insulation layer on a surface of the light-sensitive semiconductor layer and the first and second electrodes,
wherein the first and second electrodes cross each other, without contacting each other, over the surface of the light-sensitive semiconductor layer.

12. The remote touch panel of claim 7, further comprising:
first contacts electrically connecting the first electrodes to the light-sensitive semiconductor layer; and
a transparent insulation layer over a first surface of the light-sensitive semiconductor layer, the first electrodes, and the first contacts,
wherein the second electrodes directly contact a second surface of the light-sensitive semiconductor layer that is opposite to the first surface.

13. The remote touch panel of claim 7, wherein the first electrodes directly contact a surface of the light-sensitive semiconductor layer, and the second electrodes directly contact a surface of the light-sensitive semiconductor layer opposite to the surface contacting the first electrodes.

14. The remote touch panel of claim 7, wherein at least one of the first and second electrodes has a pattern including at least one of a circular, an oval, and a polygonal shape for each light sensor cell area.

15. The remote touch panel of claim 1, wherein the plurality of light sensor cells share the light-sensitive semiconductor layer, the first electrodes are on a surface of the light-sensitive semiconductor layer and have a pattern including at least one of a circular, an oval, and a polygonal shape for each light sensor cell area, and the second electrodes are in one layer without a pattern over an entire area of a surface of the light-sensitive semiconductor layer opposite to the surface on which the first electrodes are arranged.

16. The remote touch panel of claim 15, further comprising:
a plurality of current sensing sensors that are arranged at a plurality of points whose positions on the light-sensitive semiconductor layer are known.

17. The remote touch panel of claim 1, wherein the first and second electrodes are transparent electrodes.

18. The remote touch panel of claim 17, wherein the transparent electrodes are one of ITO and IZO.

19. The remote touch panel of claim 1, wherein, of the first and second electrodes, a positive electrode to which a positive voltage is applied is processed to have a relatively high work function and a negative electrode to which a negative voltage is applied is processed to have a relatively low work function.

20. The remote touch panel of claim 1, wherein a positive electrode having a relatively high work function has a work function within about 4.8-5.2 eV, and a negative electrode having a relatively low work function has a work function within about 4.1-4.5 eV.

21. A remote touch screen apparatus comprising:
the remote touch panel according to claim 1;
the display apparatus for displaying an image; and
a light source apparatus for emitting the light signal to the remote touch panel.

22. The remote touch screen apparatus of claim 21, wherein a pixel in the display apparatus is divided into four areas, three of the four areas are assigned to RGB sub-pixels for red, green, and blue colors, and a light sensor cell of the remote touch panel is in the fourth area.

23. The remote touch screen apparatus of claim 21, wherein the display apparatus is configured to display at least one of an image upon which a moving, increasing, decreasing, hiding, or rotating operation is performed on a part or all of the image, and is further configured to display a menu upon which a selection, execution, or cancel operation of the menu is performed, according to a change in a light signal emitted to the remote touch panel.

24. The remote touch screen apparatus of claim 23, wherein the change in a light signal comprises any one or a combination of proportional increase or decrease in the size of the light signal, movement of the light signal, extension of the light signal in one direction only, a change in the shape of the light signal, a change in an amount of time the light signal is incident, a change in the intensity of the light signal, a change in the wavelength of the light signal, and a change in the frequency of the light signal that is continuously incident within a time period.

25. The remote touch screen apparatus of claim 23 further comprising:
a calculation unit for calculating the change in the light signal emitted to the remote touch panel and providing information on the light signal change; and
a control unit for controlling the display apparatus to perform a particular operation based on the information on the light signal change from the calculation unit.

26. The remote touch panel of claim 1, wherein a substantial portion of the light-sensitive semiconductor layer is exposed to incident light.

\* \* \* \* \*